United States Patent
Sai (10) Patent No.: US 7,232,257 B2
(45) Date of Patent: Jun. 19, 2007

(54) HYDROSTATIC BEARING AND STAGE APPARATUS USING SAME

(75) Inventor: Choshoku Sai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 10/152,684

(22) Filed: May 23, 2002

(65) Prior Publication Data

US 2002/0176061 A1    Nov. 28, 2002

(30) Foreign Application Priority Data

May 25, 2001   (JP)   ............................. 2001-156463

(51) Int. Cl.
*F16C 32/06*   (2006.01)
(52) U.S. Cl. ........................................ 384/12
(58) Field of Classification Search ............... 384/107, 384/12, 100, 124, 121
See application file for complete search history.

(56) References Cited

U.S. PATENT DOCUMENTS

| | | | |
|---|---|---|---|
| 3,407,012 A | 10/1968 | Siebers | |
| 4,726,689 A | 2/1988 | Pollock | ........................ 384/12 |
| 4,788,902 A | 12/1988 | Akasaka et al. | ............... 91/486 |
| 4,978,233 A | 12/1990 | Stötzel et al. | .................. 384/12 |

FOREIGN PATENT DOCUMENTS

| | | |
|---|---|---|
| CH | 496 905 | 11/1970 |
| DE | 33 38 075 A1 | 5/1984 |
| DE | 39 09 204 A1 | 9/1990 |
| DE | 198 26 519 A1 | 12/1999 |
| EP | 0 361 026 | 7/1989 |
| KR | 90-003793 | 5/1990 |
| KR | 1997-0045875 | 7/1997 |

OTHER PUBLICATIONS

European Search Report dated Apr. 28, 2003, issued in corresponding European patent appln. No. 02 25 3615, forwarded in a communication dated May 19, 2003.
Korean Office Action dated Apr. 30, 2004, issued in a corresponding Korean patent application, No. 10-2002-0028899.
Patent Abstracts of Japan for Publication No. 09-177784, Jul. 11, 1997, which corresponds to Korean Patent Document No. 1997-0045875.

*Primary Examiner*—Lenard A. Footland
(74) *Attorney, Agent, or Firm*—Fitzpatrick, Cella, Harper & Scinto (57) ABSTRACT

A hydrostatic bearing apparatus has a hydrostatic bearing pad, a labyrinth seal part having an exhaust groove provided around the outside of the hydrostatic bearing pad, an adjustment mechanism for adjusting a labyrinth seal part gap, non-contacting displacement gauges for sensing changes in the size of the gap, and actuators that are activated to adjust the gap so as to maintain the gap at a predetermined constant value. The exhaust groove parts and the labyrinth seal part can move relative to each other, and an annular seal forms an airtight seal to prevent air leaks and keep the bearing steady.

9 Claims, 11 Drawing Sheets

| | |
|---|---|
| URL | http://www.maintain.co.jp/db/input.html |

TROUBLE DATABASE INPUT SCREEN

DATE OF OCCURRENCE    [2000/3/15] ~1404
MODEL                 [**********] ~1401
TYPE OF PROBLEM [OPERATIONAL MALFUNCTION (START-UP ERROR)] ~1403
EQUIPMENT SERIAL NUMBER [465NS4580001] ~1402
DEGREE OF URGENCY     [D] ~1405

SYMPTOMS  [AFTER THE POWER IS TURNED ON
           THE LED CONTINUES TO FLASH] ~1406

SOLUTION  [TURN THE POWER OFF AND THEN ON
           AGAIN (PRESS THE RED BUTTON)] ~1407

HISTORY   [INITIAL SOLUTIONS TRIED] ~1408

[SEND] [RESET]     1410              1411           1412
           LINK TO RESULTS LIST DATABASE  SOFTWARE LIBRARY  OPERATING GUIDE

FIG. 10

SEMICONDUCTOR DEVICE PRODUCTION FLOW

FIG. 11 ic # HYDROSTATIC BEARING AND STAGE APPARATUS USING SAME

FIELD OF THE INVENTION

The present invention relates to a hydrostatic bearing adaptable to a high vacuum and a stage apparatus using the same, and more particularly, to a hydrostatic bearing and stage apparatus using the same, suitable for a variety of measuring apparatuses as well as apparatuses for positioning exposure devices in a vacuum as used in the semiconductor lithography processes.

BACKGROUND OF THE INVENTION

A typical example of the conventional art is disclosed in U.S. Pat. No. 4,726,689, in which a plurality of exhaust grooves are provided on a housing for a direct air bearing disclosed therein, with several of the grooves nearest a vacuum chamber being exhausted by the vacuum pump and the groove furthest from the vacuum chamber being opened to the atmosphere.

However, the conventional art described above has several disadvantages.

The exhaust system of the conventional art requires a large number of pumps in order to operate properly, which increases the size and weight of the bearing. Moreover, the exhaust system is located outside the vacuum chamber, which is unsuitable for use with a stage capable of two-dimensional movement like the XY stage.

SUMMARY OF THE INVENTION

Accordingly, the present invention has been proposed to solve the above-described problems of the conventional art, and has as its object to provide a hydrostatic bearing apparatus that is relatively compact, lightweight, and capable of high-accuracy positioning, and which can be used inside a high vacuum.

In order to achieve the above-described objects, the present invention provides a hydrostatic bearing apparatus comprising:

a hydrostatic bearing pad;

an inlet part having an exhaust groove along an outer periphery of the hydrostatic bearing pad;

a gap adjustment mechanism for adjusting a gap between the inlet part and a surface disposed opposite the inlet part;

a sensor that senses the gap; and a control unit that controls the gap adjustment mechanism based on the sensor output.

According to the above-described invention, the high vacuum-adaptable hydrostatic bearing apparatus can be made lighter and more compact.

The exhaust groove and the inlet part may be separate components, and a seal may be disposed between the exhaust groove and the inlet part so as to form an airtight seal therebetween. Additionally, the exhaust groove may form a single unit with the hydrostatic bearing or it may be fixedly mounted to the bearing as a separate component.

Air that is expelled from the hydrostatic bearing may be forcibly expelled by a vacuum pump attached to the exhaust groove. Additionally, by making the gap between the inlet part and the surface opposite thereto as narrow as possible and by reducing the amount of air that cannot be completely exhausted by the vacuum pump and which flows into the vacuum chamber via the gap at the inlet part, the interior of the chamber can be maintained in a high-vacuum state.

It is preferable that the above-described exhaust groove and the inlet part be capable of movement relative to each other and that an airtight seal be formed therebetween. Preferably, the seal is a substantially annular or a substantially rectangular seal, and may be made of an O-ring or of a magnetic material. The above-described gap adjustment mechanism may be a piezoelectric element, a giant magnetostrictive element or an electromagnet. The gap sensor may be a non-contacting displacement gauge or its equivalent. The non-contacting displacement gauge may be an electrostatic capacity type, an eddy current type or an optical pick-up type sensor. Preferably, there is further provided a pre-loading part for maintaining at least one of either the gap between the inlet part and the surface disposed opposite the inlet part the between the hydrostatic bearing pad and a surface disposed opposite the hydrostatic bearing pad.

Additionally, the present invention is adaptable to a stage apparatus using any of the above-described hydrostatic bearing apparatus, a stage apparatus used as a positioning device for a semiconductor exposure device, and an exposure device equipped with a stage apparatus.

Additionally, it is preferable that the present invention be adaptable as well to a semiconductor device manufacturing method comprising the steps of installing a group of production apparatuses that includes an exposure apparatus in a semiconductor production plant, and manufacturing semiconductor devices by a plurality of different processes using the group of production apparatuses. Preferably, such a method for manufacturing further includes the steps of connecting the group of production apparatuses via a local area network (LAN), and receiving and transmitting data on at least one apparatus among the group of production apparatuses between the local area network (LAN) that connects the group of production apparatuses and an external network of the semiconductor production plant. Preferably, the method for manufacturing accesses a database provided by a vendor or a user of the group of production apparatuses via an external network and obtains downloads of maintenance information, or controls production by transmitting data between different factories via an external network.

Additionally, the present invention is also adaptable to a semiconductor production plant comprising:

a group of production apparatuses for performing a variety of processes;

a local area network (LAN) that connects the group of production apparatuses; and a gateway for enabling access from the LAN to an network external to the production plant, the plant transmitting information on at least one unit in the group of production apparatuses via the LAN and the external network.

Additionally, the present invention is also adaptable to an exposure device, such that the maintenance method comprises the steps of:

providing a maintenance database connected to an external network of a semiconductor production plant;

allowing access to the maintenance database via the external network from inside the semiconductor production plant; and transmitting maintenance information stored in the maintenance database to the semiconductor production plant via the external network.

Preferably, the network software provides a user interface on the display screen for the purpose of accessing a maintenance database provided by the vendor or the user of the exposure device via connection to a network external to the production plant in which the exposure device is installed, so as to enable the user to obtain information from the database via the network.

According to the present invention as described above, the hydrostatic bearing apparatus can be made compact and lightweight. As a result, when adapted to use in a stage, the overall weight of the stage itself, and particularly that of the movable body, which is supported by the hydrostatic bearing pad, can be reduced. The reduction in weight results in prompt, accurate positioning of the stage. Moreover, by reducing the number of pumps, the cost of the apparatus can be reduced as well, with the additional advantage of making it possible to achieve the advantages of a stage movable in two dimensions within the vacuum chamber by using a relatively simple construction.

Other objects, features and advantages of the present invention besides those discussed above shall be apparent to those skilled in the art from the description of a preferred embodiment of the invention which follows. In the description, reference is made to the accompanying drawings, which form a part thereof, and which illustrate an example of the invention. Such an example, however, is not exhaustive of the various embodiments of the invention, and therefore reference is made to the claims which follow the description for determining the scope of the invention.

DETAILED DESCRIPTION OF THE PREFERRED EMBODIMENTS

Preferred embodiments of the present invention will now be described in detail in accordance with the accompanying drawings.

A description will now be given of a hydrostatic bearing apparatus according to a first embodiment of the present invention, with reference in the first instance to FIGS. 1A, 1B and 1C. It should be noted that the rectangular hydrostatic bearing apparatus referenced below is disposed inside a vacuum chamber not shown in the diagrams.

Figure 1A:
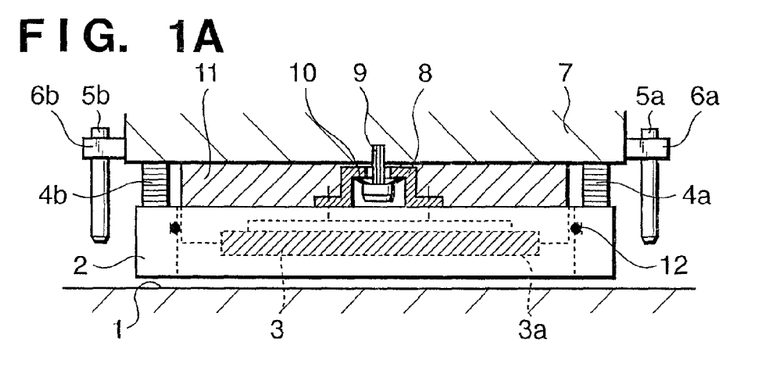
FIG. 1A is a front view of a hydrostatic bearing apparatus according to the first embodiment of the present invention.

FIG. 1A is a front view of a hydrostatic bearing apparatus according to the first embodiment of the present invention; FIG. 1B is a bottom view of a hydrostatic bearing apparatus according to a first embodiment of the present invention and FIG. 1C is a cross-sectional view along the line A—A of FIG. 1B.

The hydrostatic bearing apparatus shown in the present invention comprises a guide surface 1, a labyrinth-like inlet part 2 disposed opposite the guide surface 1, and a hydrostatic bearing pad 3. Exhaust groove parts 18 are provided around a periphery of a bearing surface 3a of the hydrostatic bearing pad 3. The labyrinth seal part 2 surrounds the outer periphery of each of the exhaust groove parts 18 and acts as a seal to reduce fluid leakage therefrom.

The exhaust groove parts 18 may form a single integrated unit with a bearing housing 11. Alternatively, the exhaust groove parts 18 may be attached to the housing 11 as separate parts. As shown in the diagram, in the present embodiment, the exhaust groove parts 18 are continuous in a longitudinal direction of the substantially rectangular housing 11, at the four corners thereof. The exhaust groove parts 18 of the four corners communicate via a first exhaust path 16 along the periphery of the housing 11. The exhaust groove parts 18 also communicate via a second exhaust path 19 provided on a moving body 7. The exhaust groove parts 18 and the labyrinth seal part 2 are separate parts, separated by a small gap, and so a flexible sealing material is used to seal the gap and prevent fluid leakage. The sealing material may be an O-ring.

Actuators 4a and 4b are positioned at two places on a side disposed opposite the guide surface 1 and the labyrinth seal part 2 opposite the guide surface 1. As shown in FIGS. 1A–1C, one edge of the actuators 4a, 4b is fixedly mounted on the labyrinth seal part 2. The other end of the actuator 4a, 4b is fixedly mounted to the movable body 7 that supports the hydrostatic bearing apparatus.

Additionally, as shown in FIG. 1A, the labyrinth seal part 2 and the movable body are connected to each other by a pre-loading spring 10, a pre-loading screw 9 and a mounting component 8 that fixedly mounts the spring 10 and screw 9 to the labyrinth seal part 2. As a result, the exhaust groove part 18 and the labyrinth seal part 2 are capable of movement relative to each other.

Non-contacting displacement gauges 5a, 5b that function as sensors that detect a minute gap hr between the labyrinth seal part 2 and the guide surface 1 are mounted to left and right lateral surfaces of the movable body 7 by holders 6a, 6b so as to be able to constantly monitor changes in the gap hr. The hydrostatic bearing apparatus has a control unit that controls a gap adjustment mechanism that includes the actuators 4a, 4b, such that when the output from the displacement gauges 5a, 5b is input to the control unit, the actuators 4a, 4b are activated to maintain the gap hr at a constant value.

The housing 11 to which the hydrostatic bearing pad 3 is fixedly attached connects directly to the movable body 7. A supply of high-pressure air to the hydrostatic bearing pad 3 is provided via an air supply duct 14 that is opened across both the moving body 7 and the housing 11 and aligned with the center of the hydrostatic bearing pad 3.

Further, the exhaust groove part 18 is designed so as to connect directly to the first exhaust path 16 along the periphery of the housing 11 and, via a pipe not shown in the diagrams, to a vacuum pump 17 disposed outside the vacuum chamber.

A description will now be given of the principle according to which the hydrostatic bearing apparatus of the present embodiment operates.

The hydrostatic bearing apparatus is supplied with compressed air from a compressed air source not shown in the diagrams, but disposed outside the vacuum chamber. The air is supplied to an air supply duct 14 via a pipe. The air that spurts our from the bearing surface 3a of the hydrostatic bearing pad 3 forms a cushion having a density or pressure capable of supporting a load within the bearing gap h between the bearing surface 3a and the guide surface 1. Virtually all of the air flowing away from the bearing gap h is then absorbed by the vacuum pump 17 from the exhaust groove parts 18, with the remaining air being exhausted into the vacuum chamber via the labyrinth seal part gap hr disposed between a lower surface of the labyrinth seal part 2 and the guide surface 1. The air that flows into the vacuum chamber is forcibly expelled by a chamber vacuum pump (not shown in the drawings) so as to maintain the interior of the vacuum chamber at the desired vacuum.

In general, it is preferable that the bearing gap h be between 4 µm and several tens of µm, and the labyrinth seal part 2 gap hr be slightly smaller than the bearing gap in order to reduce leakage of air to the vacuum chamber. Thus, for example, it is preferable that the labyrinth seal part 2 gap hr be from 1 µm to 4 µm, and that the width of the labyrinth seal part 2 be as narrow as possible.

In the event that the movement of the movable body 7 produces a tilt, the fact that the labyrinth seal part 2 gap hr is smaller than the bearing gap h means that there is a possibility that the bottom surface of the labyrinth seal part 2 and the guide surface 1 might come into contact with each other. As a result, the present invention is designed so that the non-contacting displacement gauges 5a, 5b described above constantly monitor the labyrinth seal part 2 gap hr and, if the labyrinth seal part 2 gap hr is displaced by more than a permissible amount Δ hr, the laterally-disposed actuators 4a, 4b are activated in order to move the labyrinth seal part 2 so as to offset the displacement of the gap and thereby maintain the labyrinth seal part 2 gap hr at a constant value.

Figure 1B:
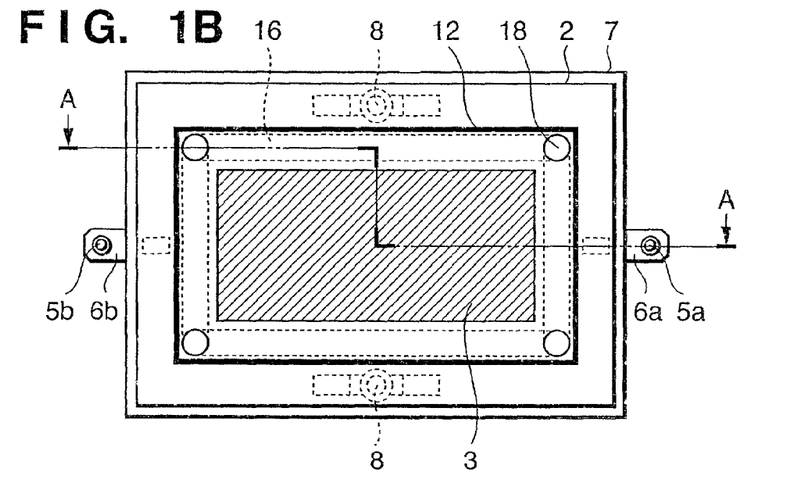
FIG. 1B is a bottom view of a hydrostatic bearing apparatus according to a first embodiment of the present invention and FIG. 1C is a cross-sectional view along the line A—A of FIG. 1B.
Figure 1C:
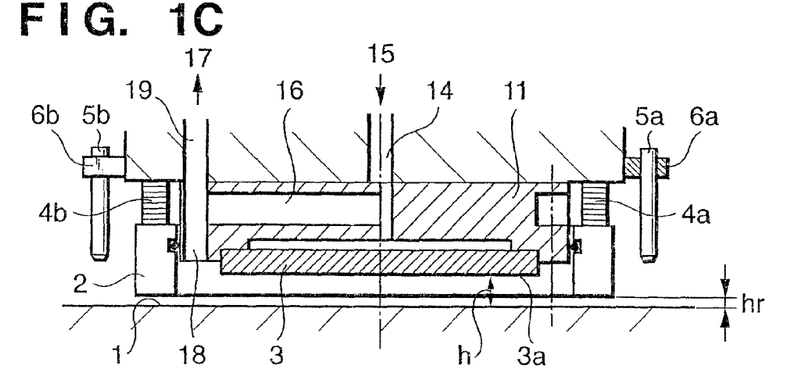

Those of ordinary skill in the art will appreciate that the shape of the hydrostatic bearing of the present invention is not limited to the rectangular shape shown in FIGS. 1A–1C. Instead, the bearing may be round, oval or a thrust block of some other shape.

Additionally, the number of non-contacting displacement gauges to be used is not set, and may be increased to three or more as necessary.

Similarly, the number of actuators is not set, either, and may be increased to three or more as necessary.

The actuators may be piezoelectric elements, giant magnetostrictive elements or electromagnets.

A description will now be given of a second embodiment of the present invention.

Figure 2:
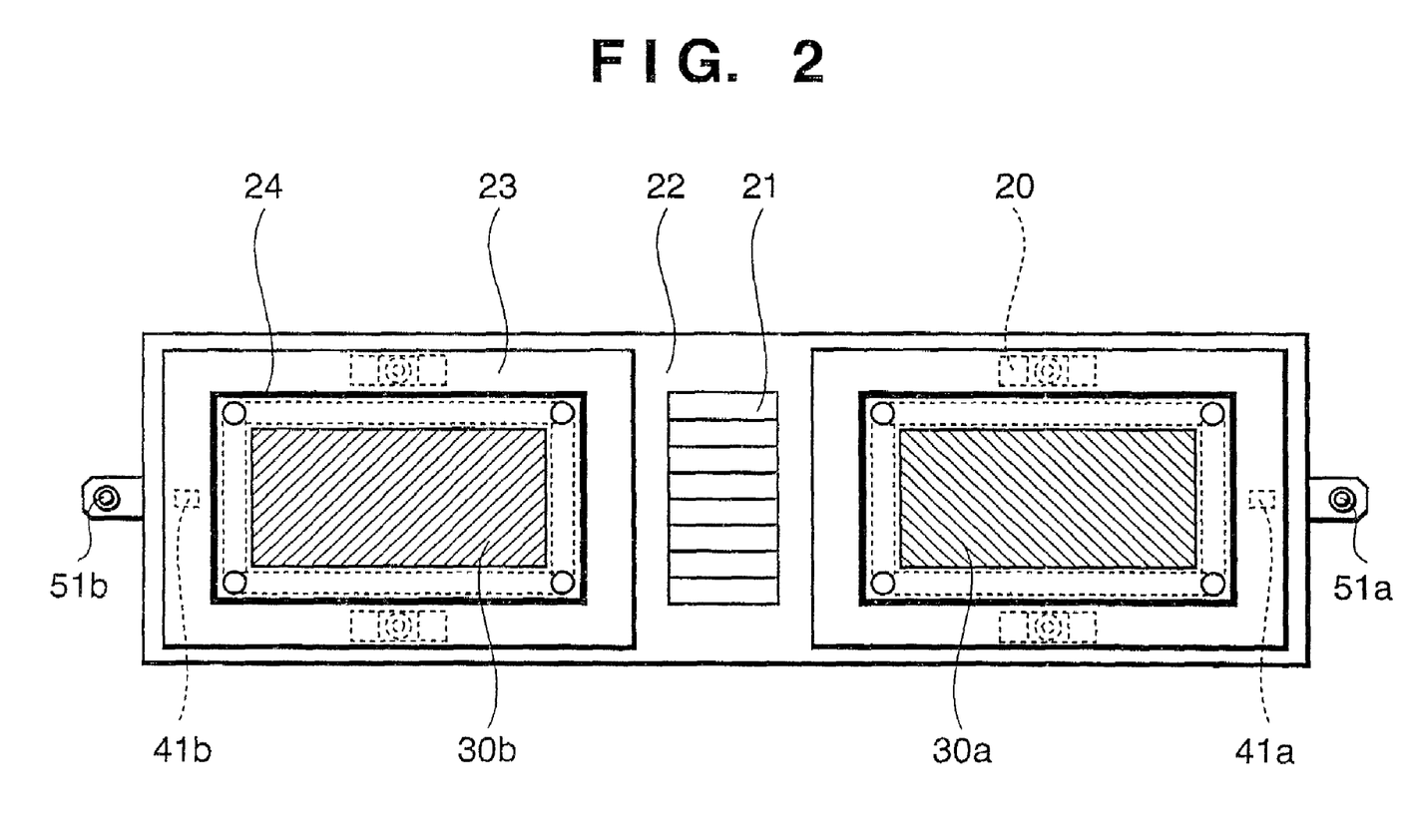
FIG. 2 is a bottom view of a hydrostatic bearing apparatus according to a second embodiment of the present invention, with two hydrostatic bearing pads.

FIG. 2 is a bottom view of a hydrostatic bearing apparatus according to a second embodiment of the present invention, using two of the hydrostatic bearing pads 2 of the first embodiment described with reference to FIGS. 1A–1C.

As shown in FIG. 2, the hydrostatic bearing apparatus according to this second embodiment of the present invention provides a pre-loading magnet 21 between the two hydrostatic bearing pads 30a, 30b, as a pre-loading part intended to aid in maintaining the bearing gap h. Additionally, actuators 41a, 41b are disposed outside of the two hydrostatic bearing pads 30a, 30b. Non-contacting displacement gauges 51a, 51b are similarly positioned outside the lateral ends of a movable body 22, with pre-loading mechanism 20 disposed at the front and back of each labyrinth seal part 23. In FIG. 2, reference numeral 24 denotes a seal. The operating principle of the second embodiment of the present invention is the same as that of the first embodiment shown in FIGS. 1A–1C.

The structure of the above-described embodiment is especially effective for those actual stages in which the movable body 22 itself is lightweight or where the stage does not bear the weight of the movable body itself, like a horizontal guide.

A description will now be given of a third embodiment of the present invention.

Figure 3:
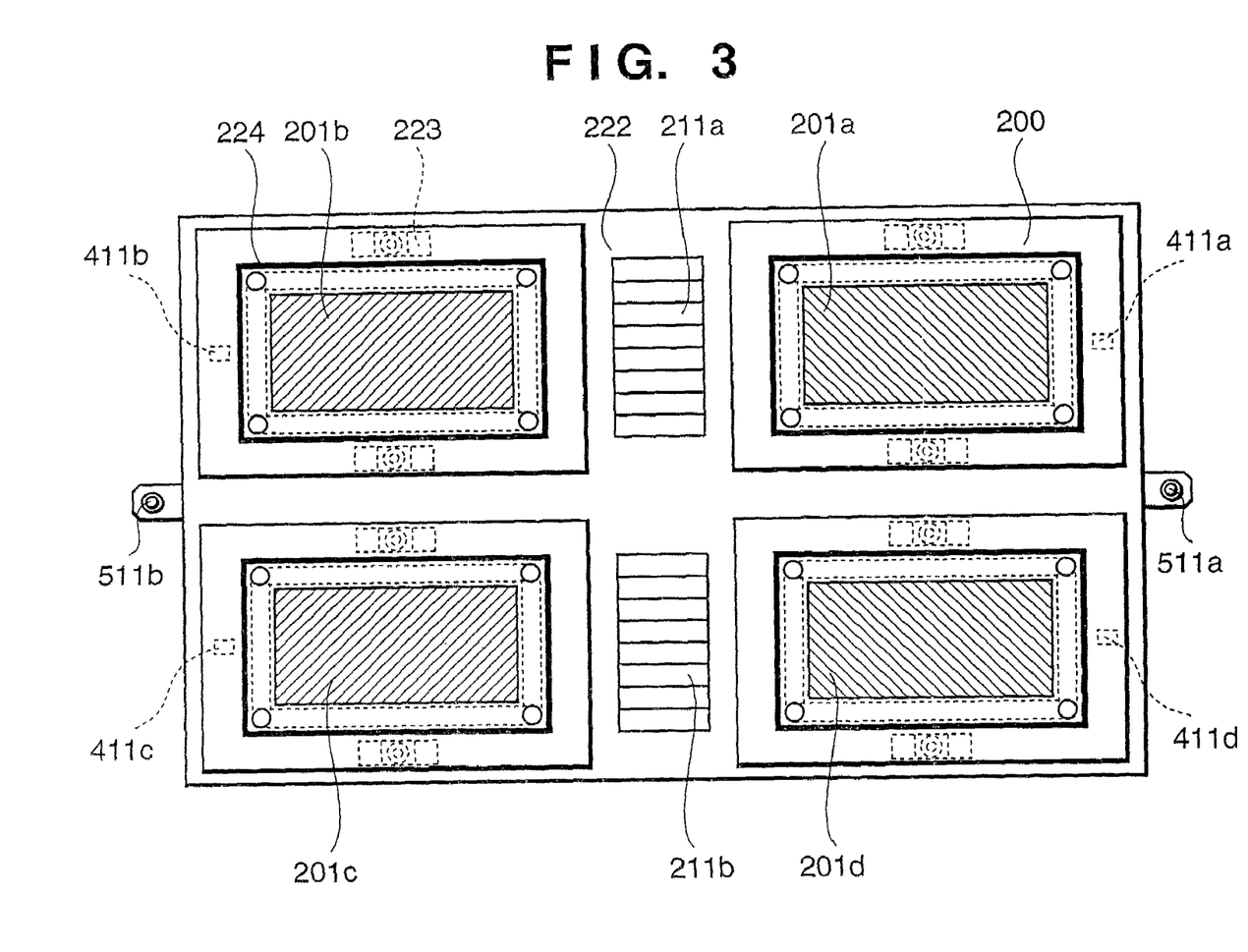
FIG. 3 is a bottom view of a hydrostatic bearing apparatus according to a third embodiment of the present invention, with four hydrostatic bearing pads.

FIG. 3 is a bottom view of a hydrostatic bearing apparatus according to a third embodiment of the present invention, with four of the hydrostatic bearing pads described with reference to the first embodiment depicted in FIGS. 1A–1C. The hydrostatic bearing apparatus according to the third embodiment provides a first pre-loading magnet 211a between hydrostatic bearing pads 201a, 201b and a second pre-loading magnet 211b between hydrostatic bearing pads 201c, 201d. Additionally, the hydrostatic bearing apparatus according to the third embodiment provides actuators 411a, 411b, 411c and 411d, two each of which are positioned at the lateral ends of the apparatus as shown in FIG. 3. Non-contacting displacement gauges 511a, 511b are provided at he lateral edges of the movable body 222. Pre-loading mechanisms 223 are provided at the front and back of each of the labyrinth seal parts 200. In FIG. 3, reference numeral 224 denotes a seal. The operating principle of the third embodiment of the present invention is the same as that of the first embodiment shown in FIGS. 1A–1C and of the second embodiment shown in FIG. 2.

A description will now be given of a fourth embodiment of the present invention.

Figure 4A:
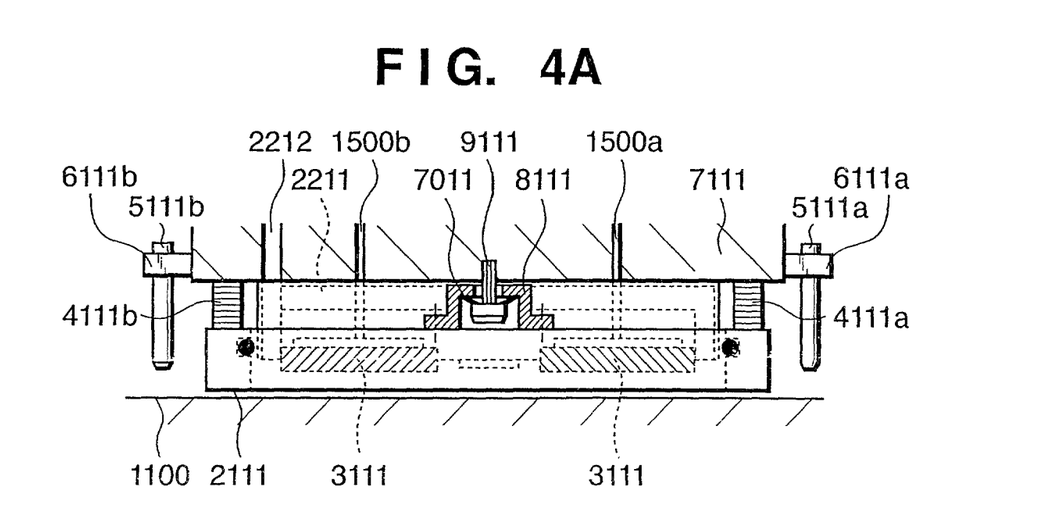
FIG. 4A is a side view of a hydrostatic bearing apparatus according to a fourth embodiment of the present invention.
Figure 4B:
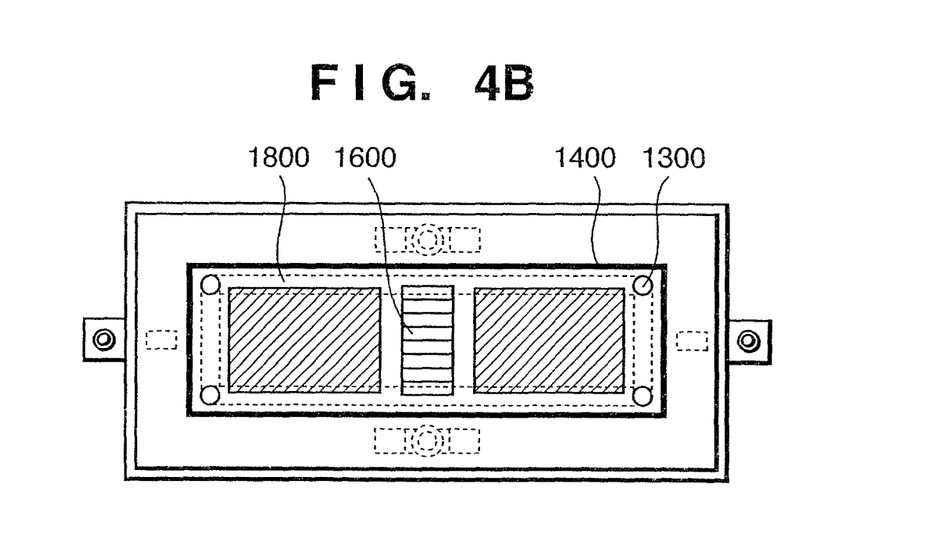
FIG. 4B shows a bottom view of a hydrostatic bearing apparatus according to a fourth embodiment of the present invention, with two pads.

FIG. 4A is a side view of a hydrostatic bearing apparatus according to a fourth embodiment of the present invention, and FIG. 4B shows a bottom view of a hydrostatic bearing apparatus according to a fourth embodiment of the present invention, with two pads.

Essentially, the fourth embodiment is a variation of the second embodiment, in which the two hydrostatic bearing pads 3111 are entirely surrounded by the exhaust groove part 1800 and the exhaust groove part 1800 is surrounded by the labyrinth seal part 2111. A pre-loading magnet 1600 is provided between the two hydrostatic bearing pads 3111, and actuators 4111a, 4111b are disposed opposite a surface opposite a guide surface 1100 of the labyrinth seal part 2111 provided outside the two longitudinally disposed hydrostatic bearing pads. Likewise, non-contacting displacement gauges 5111a, 5111b are similarly positioned at the two lateral ends of the movable body 7111, via holders 6111a, 6111b. In FIGS. 4A and 4B, reference numeral 1300 denotes an exhaust port, 1400 denotes the seal, 1600 denotes the pre-loading magnet, 2211, 2212 denote the exhaust path, 7011 denotes a first pre-loading screw, 8111 denotes a mounting component and 9111 denotes a second pre-loading screw. The operating principle of the fourth embodiment of the present invention is the same as that of the first embodiment shown in FIGS. 1A–1C.

Compared to the second embodiment described above with reference to FIG. 2, the fourth embodiment permits a reduction of the number of non-contacting displacement gauges and actuators.

A description will now be given of a fifth embodiment of the present invention.

Figure 5:
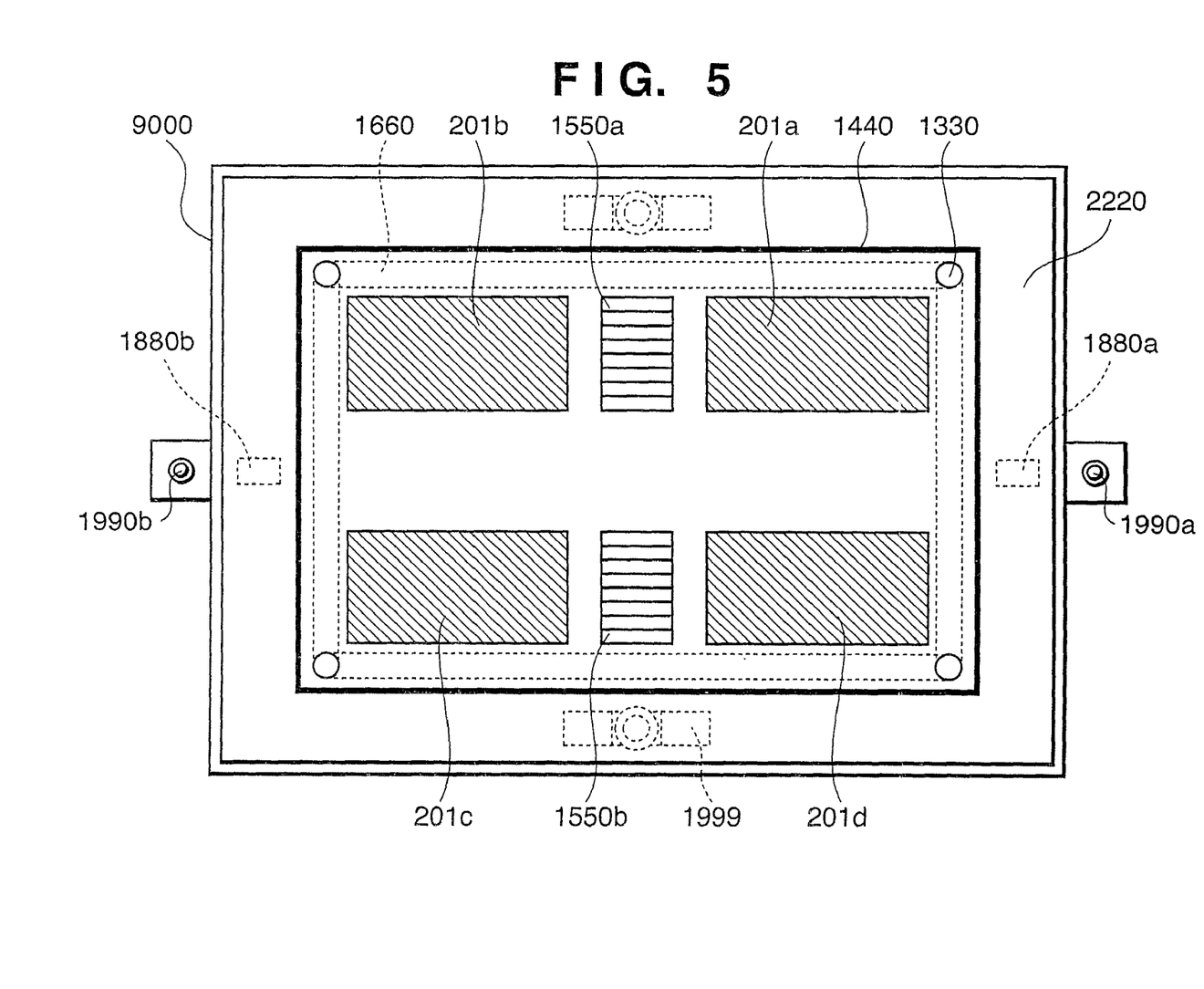
FIG. 5 is a bottom view of a hydrostatic bearing apparatus according to a fifth embodiment of the present invention, with four hydrostatic bearing pads.

FIG. 5 is a bottom view of a hydrostatic bearing apparatus according to a fifth embodiment of the present invention, with four hydrostatic bearing pads. In the hydrostatic bearing apparatus according to the fifth embodiment, all four of the hydrostatic bearing pads 201a, 201b, 201c, 201d are entirely surrounded by the exhaust groove part 1660 and the exhaust groove part 1800 is surrounded by the labyrinth seal part 2220. Pre-loading magnets 1550a, 1550b are provided between each of the two sets of hydrostatic bearing pads as shown in FIG. 5, and actuators 1880a, 1880b are disposed at both lateral ends, opposite the labyrinth seal part 2220 that lies outside the hydrostatic bearing pads. Similarly, non-contacting displacement gauges 1990a, 1990b are provided at both lateral ends of the movable body 9000. In FIG. 5, 1330 is the exhaust port, 1440 is the seal and 1999 is the pre-loading mechanism.

As those of ordinary skill in the art can appreciate, a hydrostatic bearing apparatus having the structure described above is especially suited to an actual stage in which the movable body itself is relatively large and heavy.

A description will now be given of a sixth embodiment of the present invention.

Figure 6A:
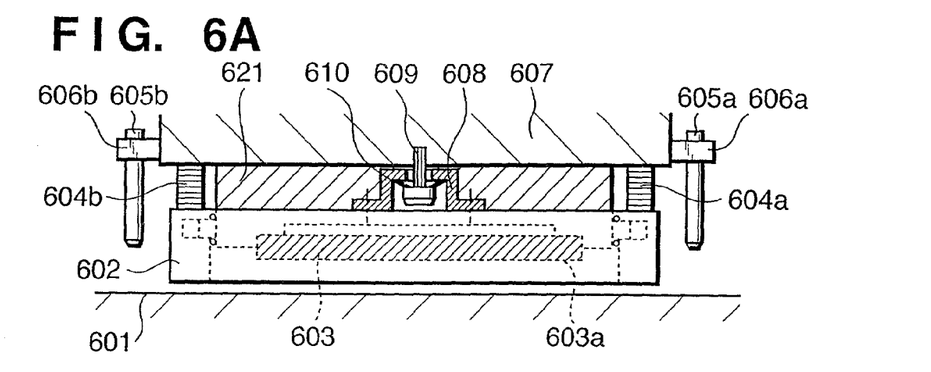
FIG. 6A is a front view of a hydrostatic bearing apparatus according to the first embodiment of the present invention.
Figure 6B:
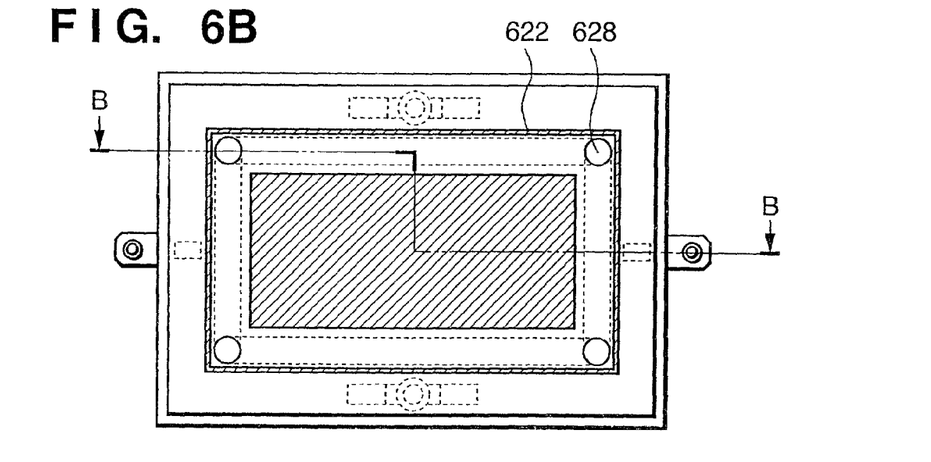
FIG. 6B is a bottom view of a hydrostatic bearing apparatus according to a first embodiment of the present invention.
Figure 6C:
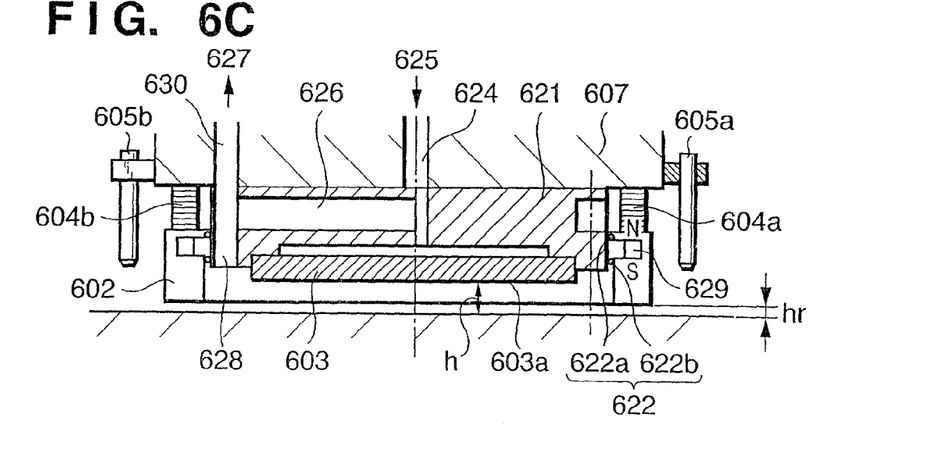
FIG. 6C is a cross-sectional view along the line B—B in FIG. 6B.

FIG. 6A is a front view of a hydrostatic bearing apparatus according to the first embodiment of the present invention; FIG. 6B is a bottom view of a hydrostatic bearing apparatus according to a first embodiment of the present invention, and FIG. 6C is a cross-sectional view along the line B—B in FIG. 6B. It should be noted that the rectangular hydrostatic bearing apparatus depicted in FIGS. 6A–6C is disposed inside a vacuum chamber not shown in the drawings, so that the ambient atmosphere of the hydrostatic bearing apparatus is a vacuum.

In the hydrostatic bearing apparatus according to the sixth embodiment, the exhaust groove parts 628 that surround the bearing surface 603a of the hydrostatic bearing pads 603 consists of a single step, with the labyrinth seal part 602 provided on the outer periphery of the exhaust groove parts 628 and acting as a seal.

The exhaust groove parts 628 may be formed as a single integrated unit with the housing 621 of the bearing formed from a magnetic material. Alternatively, the exhaust groove parts 628 may be fixedly mounted on the housing 621. The exhaust groove part 628 and the labyrinth seal part 602 are separate parts, with a slight gap between the two, and so a magnetized fluid 622 that acts as an annular seal is provided in order to form an airtight seal.

The principle by which a liquid may provide an airtight seal is as follows: As shown in FIG. 6C, a substantially annular or a substantially rectangular magnet 629 is used as the labyrinth seal part 602. By magnetizing the magnet 629 so that the direction of magnetization faces the vertical, the magnet 629, the magnetized fluid 622 and the housing 621 form a magnetic circuit that can retain the magnetized fluid 622 between the housing 621 and the labyrinth seal part 602, thus forming an airtight seal that prevents the leakage of air therefrom.

As shown in FIG. 6A, actuators 604a, 604b are fixedly mounted at two locations on the side opposite the guide surface 601 and the labyrinth seal part disposed opposite thereto. The other ends of the actuators 604a, 604b are fixedly mounted on the movable body 607 that supports the hydrostatic bearing apparatus.

Additionally, as shown in FIG. 6A, the labyrinth seal part 602 and the movable body 607 are connected to each other by a pre-loading spring 610, a pre-loading screw 609 and a mounting component 608 that fixedly mounts the spring 610 and the screw 609 to the labyrinth seal part 602. As a result, the exhaust groove part 628 and the labyrinth seal part 602 are capable of movement relative to each other.

Non-contacting displacement gauges 605a, 605b that function as sensors that detect a minute gap hr between the labyrinth seal part 602 and the guide surface 601 are mounted to left and right lateral surfaces of the movable body 607 by holders 606a, 606b so as to be able to constantly monitor changes in the gap hr.

The housing 621 to which the hydrostatic bearing pad 603 is fixedly attached connects directly to the movable body 607. A supply of high-pressure air to the hydrostatic bearing pad 603 is provided via an air supply duct 624.

Further, the exhaust groove parts 628 are connected directly to a vacuum chamber 627 provided outside the vacuum chamber, via exhaust ducts 626, 630 and a pipe not shown in the diagram.

A description will now be given of the operating principles on which the hydrostatic bearing apparatuses of the above-described embodiments are based.

The hydrostatic bearing apparatus of the present invention is supplied with compressed air from a compressed air source not shown in the diagrams but which is disposed outside the vacuum chamber, via a pipe that connects to a supply duct 624. The air that spurts out from the bearing surface 603a of the hydrostatic bearing pad 603 forms a cushion having a density or pressure capable of supporting a load within the bearing gap h formed between the bearing surface 603a and the guide surface 601. Virtually all the air flowing away from the bearing gap h is then absorbed by a vacuum pump 627 from the exhaust groove parts 628, with the remaining air being exhausted into the vacuum chamber via the labyrinth seal part gap hr disposed between a lower surface of the labyrinth seal part 602 and the guide surface 601. The air that flows into the vacuum chamber is forcibly expelled by a chamber vacuum pump (not shown in the drawings) so as to maintain the interior of the vacuum chamber at the desired vacuum.

In general, it is preferable that the bearing gap h be between 4 μm and several tens of μm, and the labyrinth seal part 602 gap hr be slightly smaller than the bearing gap in order to reduce leakage of air to the vacuum chamber. Thus, for example, it is preferable that the labyrinth seal part 602 gap hr be from 1 μm to 4 μm, and that the width of the labyrinth seal part 602 be as narrow as possible.

In the event that the movement of the movable body 607 produces a tilt, the fact that the labyrinth seal part 602 gap hr is smaller than the bearing gap h means that there is a possibility that the bottom surface of the labyrinth seal part 602 and the guide surface 601 might come into contact with each other. As a result, the present invention is designed so that the non-contacting displacement gauges 605a, 605b described above constantly monitor the gap hr of the labyrinth seal part 602 and, if the gap hr is displaced by more than a permissible amount Δ hr, the laterally-disposed actuators 604a, 604b are activated in order to move the labyrinth seal part 602 so as to offset the displacement of the gap and thereby maintain the labyrinth seal part 602 gap hr at a constant value.

Those of ordinary skill in the art will appreciate that the shape of the hydrostatic bearing of the present invention is not limited to the rectangular shape shown in FIGS. 6A–6C. Instead, the bearing may be round, oval or a thrust block of some other shape.

Additionally, the number of non-contacting displacement gauges to be used is not set, and may be increased to three or more as necessary.

Similarly, the number of actuators is not set, either, and may be increased to three or more as necessary.

The actuators may be piezoelectric elements, giant magnetostrictive elements or electromagnets.

Moreover, the hydrostatic bearing apparatus according to the sixth embodiment of the present invention as shown in FIGS. 6A–6C may be arranged as depicted with reference to the second embodiment as shown in FIG. 2, the third embodiment as shown in FIG. 3, the fourth embodiment as shown in FIGS. 4A–4B and the fifth embodiment as shown in FIG. 5.

Next, a description will be given of an embodiment of a semiconductor production system using the hydrostatic bearing apparatus according to the present invention. It should be noted that the term semiconductor is herein used to denote not only semiconductor chips but also a wide variety of other devices, including but not limited to liquid crystal display panels, charge-coupled devices, thin-film magnetic heads, micro-machines and the like. The system of the present invention is presumed to be one that uses a computer network external to the production plant in order to perform troubleshooting and regularly scheduled maintenance of, and maintenance services such as software provision for, production apparatuses installed in a semiconductor production plant.

Figure 7:
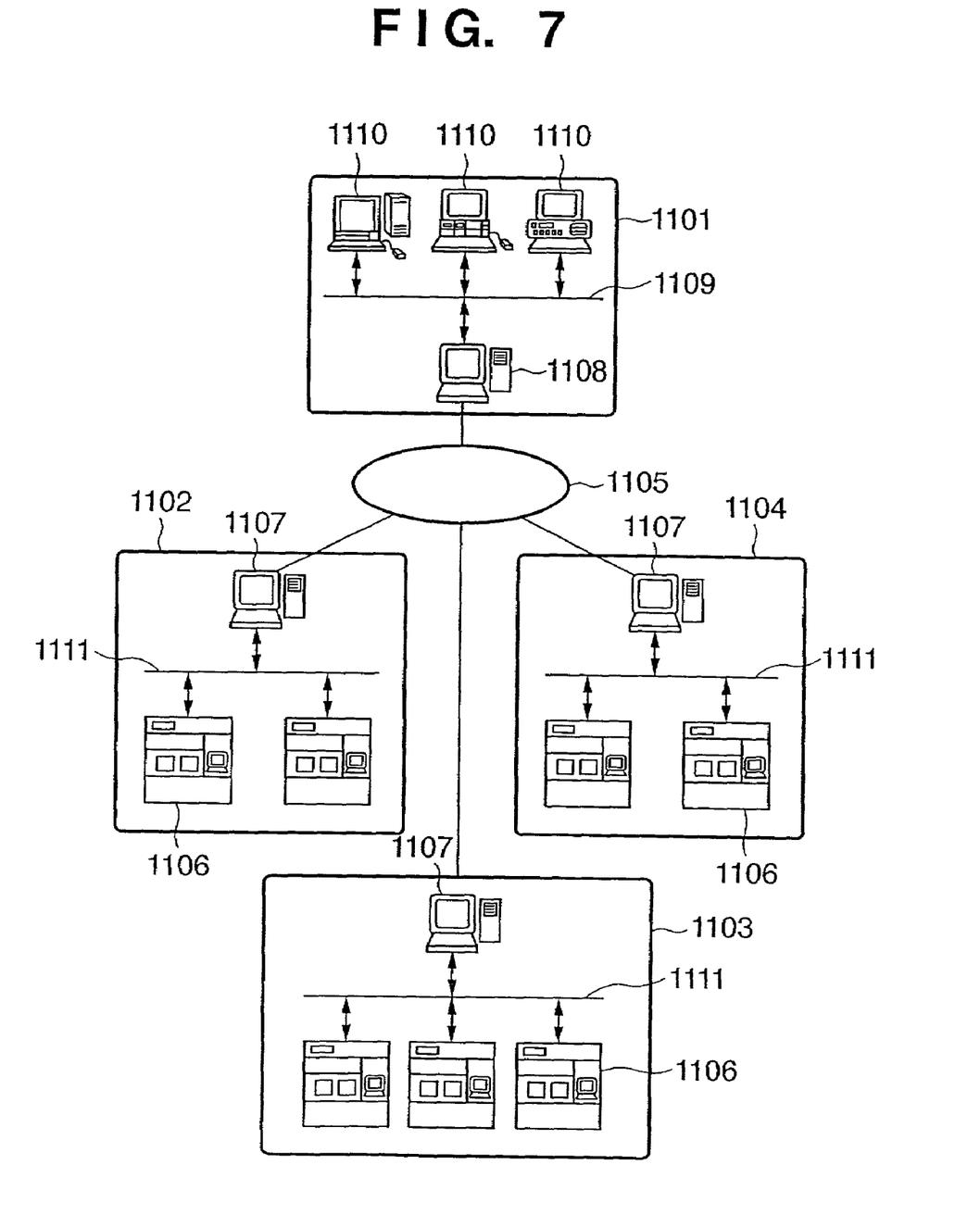
FIG. 7 is a schematic diagram of a semiconductor device production system using the apparatus according to the present invention, as viewed from a certain angle.

FIG. 7 is a schematic diagram of a semiconductor device production system using the apparatus according to the present invention, as viewed from a certain angle. In FIG. 7, reference numeral 1101 represents a place of business of a vendor that provides semiconductor device production apparatuses to manufacturers of semiconductor devices. As one illustrative example of such a production apparatus, the present explanation uses semiconductor production apparatuses designed to perform all the processes carried out in a semiconductor production plant, such as pre-processing equipment (e.g., lithography apparatuses such as exposure devices, resist processing devices and etching devices, heat treatment devices, film forming devices, planarizing devices, etc.), as well as post-processing apparatuses (e.g., assembly equipment, inspection equipment, etc.). Inside the vendor's place of business 1101 there is a host management system 1108 that provides production apparatus maintenance databases, a plurality of user computer terminals 1110 and a local area network (LAN) 1109 that connects these devices into an intranet. The host management system 1108 is equipped with a gateway for connecting the LAN 1109 to an external network (that is, the Internet 1105) and a security function for restricting access into the LAN 1109 from the outside.

Reference numerals 1102, 1103 and 1104 denote production plants of manufacturers of semiconductor devices, that is, users of semiconductor production apparatuses. Production plants 1102–1104 may belong to different manufacturers or they may belong to the same manufacturer (so that, for example, one factory may be a pre-processing plant, another factory may be a post-processing plant, and so forth). A plurality of production apparatuses 1106 as well as a LAN 1111 that ties the apparatuses into an intranet are installed in each of the production plants 1102–1104, together with a host management system 1107 that monitors the operating status of the production apparatuses 1106. The host management systems 1107 are installed in the factories 1102–1104 are each equipped with a gateway for connecting the LAN 1111 to a network external to the factories that is the Internet 1105. By so doing, it becomes possible to access the vendor's host management system 1108 from each of the LANs 1111 installed in the factories 1102–1104 via the Internet 1105, with access being permitted to a limited number of users as restricted by the security function of the host management system 1108. More specifically, via the Internet 1105, status information indicating the operating conditions of the production apparatuses 1106 (for example, symptoms indicating trouble at one of the apparatuses) can be sent to the vendor from the factory, and response information relevant to the transmitted status information (for example, troubleshooting instructions, software or data, etc.), as well as the most up-to-date software and technical support can be received from the vendor. The communications protocol widely used for the Internet, TCP/IP, is used also for this data transmission between the factories 1102–1104 and the vendor 1101, as well as for data transmission within the LANs 1111 of the individual factories 1102–1104. It should be noted that instead of using the Internet, which is external to the production plants, it is also possible to use a high-security dedicated network (such as an ISDN) designed to prevent access by third parties. Similarly, the host management system need not be limited to one provided by the vendor. Instead, the user may configure its own database, place it on the external network, and allow access to the database from any number of the user's own factories.

Figure 8:
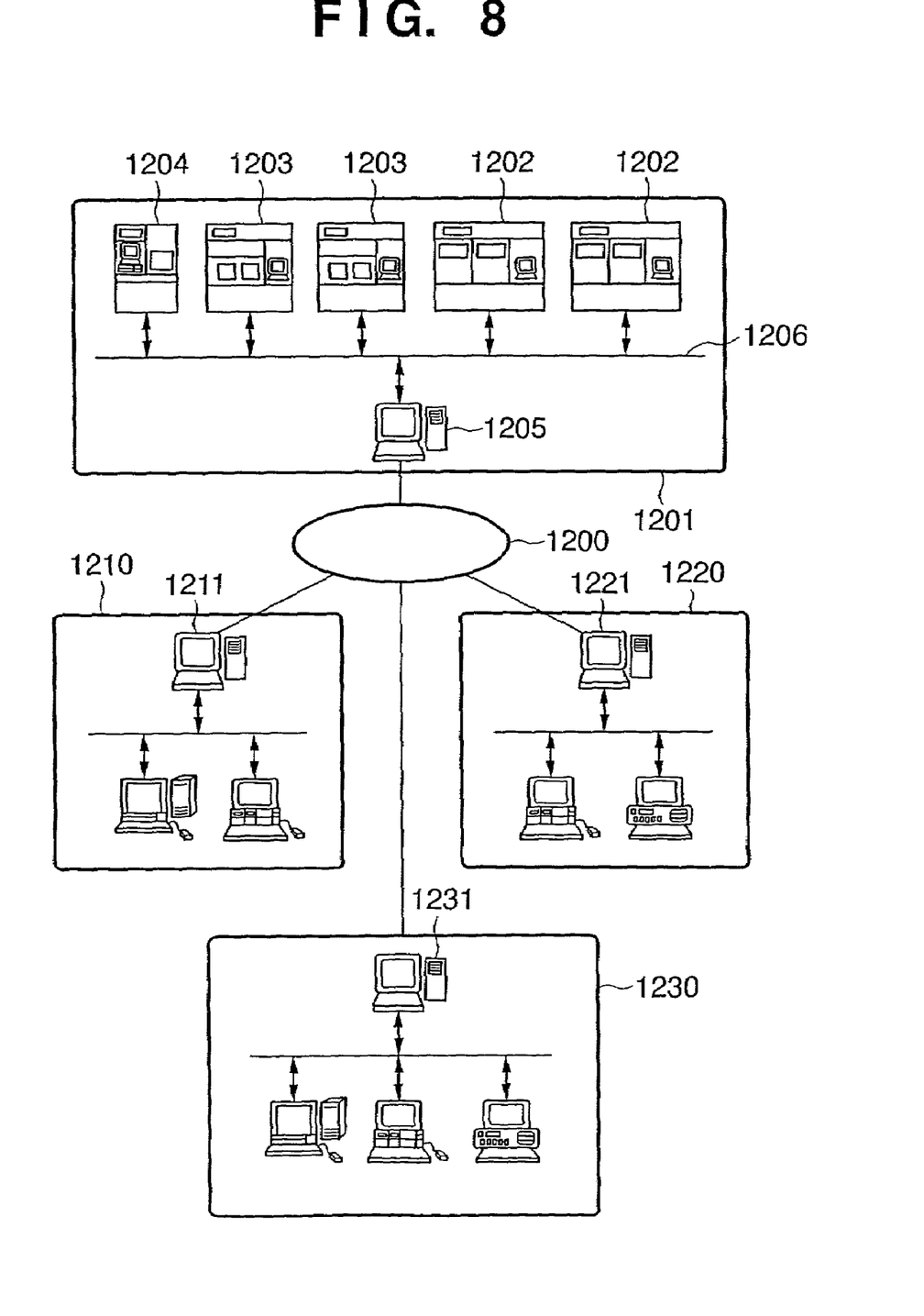
FIG. 8 is a schematic diagram of a semiconductor device production system using the apparatus according to the present invention, as viewed from a different angle.

FIG. 8 is a schematic diagram of a semiconductor device production system using the apparatus according to the present invention, as viewed from a different angle. In contrast to the previous example, in which a plurality of user factories each equipped with production apparatuses and connected via an external network to a vendor management system, with transmission of data on at least one production apparatus being transmitted together with data for production control at each factory, in the present example, a factory equipped with production equipment from a plurality of different vendors is connected via an external network to the management systems of each of the different vendors, with maintenance information on each of the production apparatuses being transmitted between the factory and the plurality of vendor management systems. In FIG. 8, reference numeral 1201 denotes the production apparatus user's production plant. That production plant is equipped with one or more production lines consisting of production apparatuses for each process to be performed at the factory, including, for example, an exposure device 1202, a resist processing device 1203, and a film forming device 1204. In FIG. 8, only a single production plant 1201 is shown. In actuality, however, a plurality of production plants may be networked in the same way. The production apparatuses in the factory are connected via a LAN 1206, with production line operation control carried out by a host management system 1205.

The places of business of the various vendors, such as that of the exposure device manufacturer 1210, the resist processing device 1203 and the film forming device 1204, are each equipped with host management systems 1211, 1221 and 1231 for remote maintenance of the equipment they have provided to the manufacturer. As noted previously, each of these host management systems 1211, 1221 and 1231 is equipped with a maintenance database and an external network gateway. The user's own production plant internal host management system 1205 for controlling the production apparatuses is connected to the host management systems 1211, 1221 and 1231 of the various vendors via either an external network 1200 such as the internet or a dedicated network.

Although the occurrence of trouble in any one of the pieces of production equipment in a given production line is enough to shut down the entire production line, with a system such as that described above it is possible to obtain prompt maintenance support from the vendor of the equipment in question, so halts in the production line can be kept to a minimum.

Figure 9:
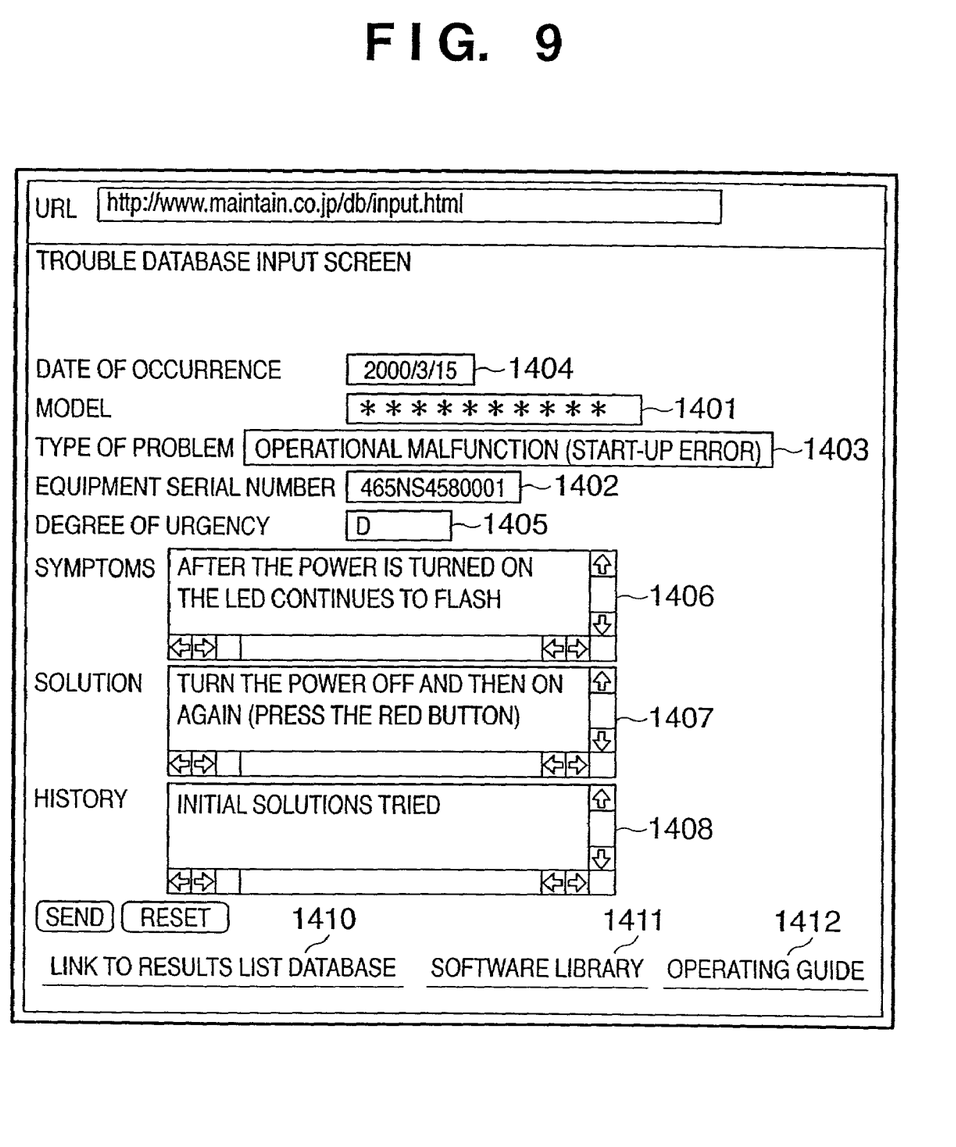
FIG. 9 shows a specific example of a user interface according to the present invention.

FIG. 9 shows a specific example of a user interface according to the present invention.

It should be noted that each production apparatus installed in a semiconductor production plant is equipped with a display, a network interface, and a computer for executing network access software stored in a storage device as well as apparatus operation software for running the equipment. The storage device may be an internal memory, a hard disk, or a network file server. The network access software includes either a special-purpose or a general-purpose web browser, and may for example provide to the display screen a user interface in the form of a screen like that shown in FIG. 9. An operator in charge of controlling production equipment at a factory checks the display screen and inputs such information as the production apparatus model 1401, serial number 1402, type of problem 1403, the date and time of the occurrence of the problem 1404, the degree of urgency 1405, the condition 1406, the treatment 1407, past progress 1408 and the like. The information that is input is then transmitted to the maintenance database via the internet or dedicated network and as a result the appropriate maintenance information is then transmitted back from the maintenance database and displayed on the display screen. Additionally, the user interface provided by the web browser may also offer hyperlinks 1410, 1411, 1412 as shown in FIG. 9. The operator can then access the hyperlinks for additional detailed information, download the newest version of the software used for the production apparatuses at the factory from a software library provided by the vendor, or download help information that will guide the factory operator in running the equipment.

It should be noted that the maintenance information provided by the maintenance database also includes the above-described information with respect to the present invention, and the software library described above also provides the latest versions of the software used to achieve the present invention.

Next, a description will be given of a production process for semiconductor devices using the production system described above.

Figure 10:
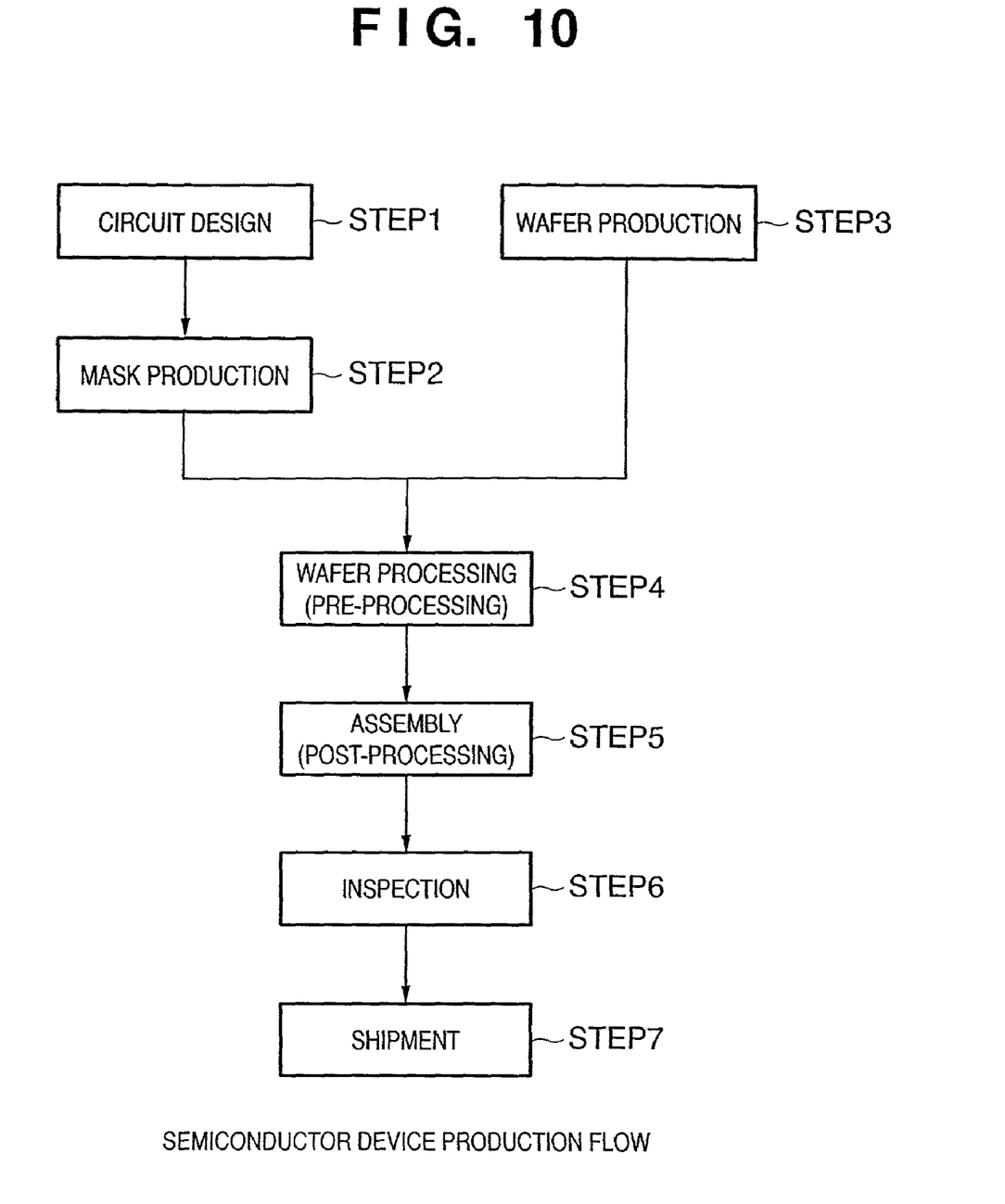
FIG. 10 is a flow chart illustrating a device production process.

FIG. 10 is a flow chart illustrating a semiconductor device production process.

In step 1 (circuit design), the circuitry of the semiconductor device is designed. In step 2 (mask production), a mask on which is formed the designed circuit pattern is produced. Meanwhile, in step 3 (wafer production), a wafer is produced using silicon or some other appropriate material. In step 4 (wafer processing), which is also called pre-processing, the mask and wafer prepared as described above are used to form an actual circuit on the wafer using a lithographic technique. The next step, step 5 (assembly), which is also called post-processing, involves using the wafers produced in step 4 to make a semiconductor chip, and includes both the assembly process proper (consisting of dicing, bonding, etc.) as well as the packaging process (that is, sealing the chip). Step 6 (inspection) involves testing the operation of the semiconductor devices produced in step 5, including the conducting of endurance tests. The thus completed semiconductor device is then shipped out in step 7. In this case, pre-processing and post-processing are carried out at separate factories, with the above-described remote maintenance system in place for each factory. Additionally, information needed for production control and apparatus maintenance is transmitted between the pre-processing factory and the post-processing factory via the internet or a dedicated network.

Figure 11:
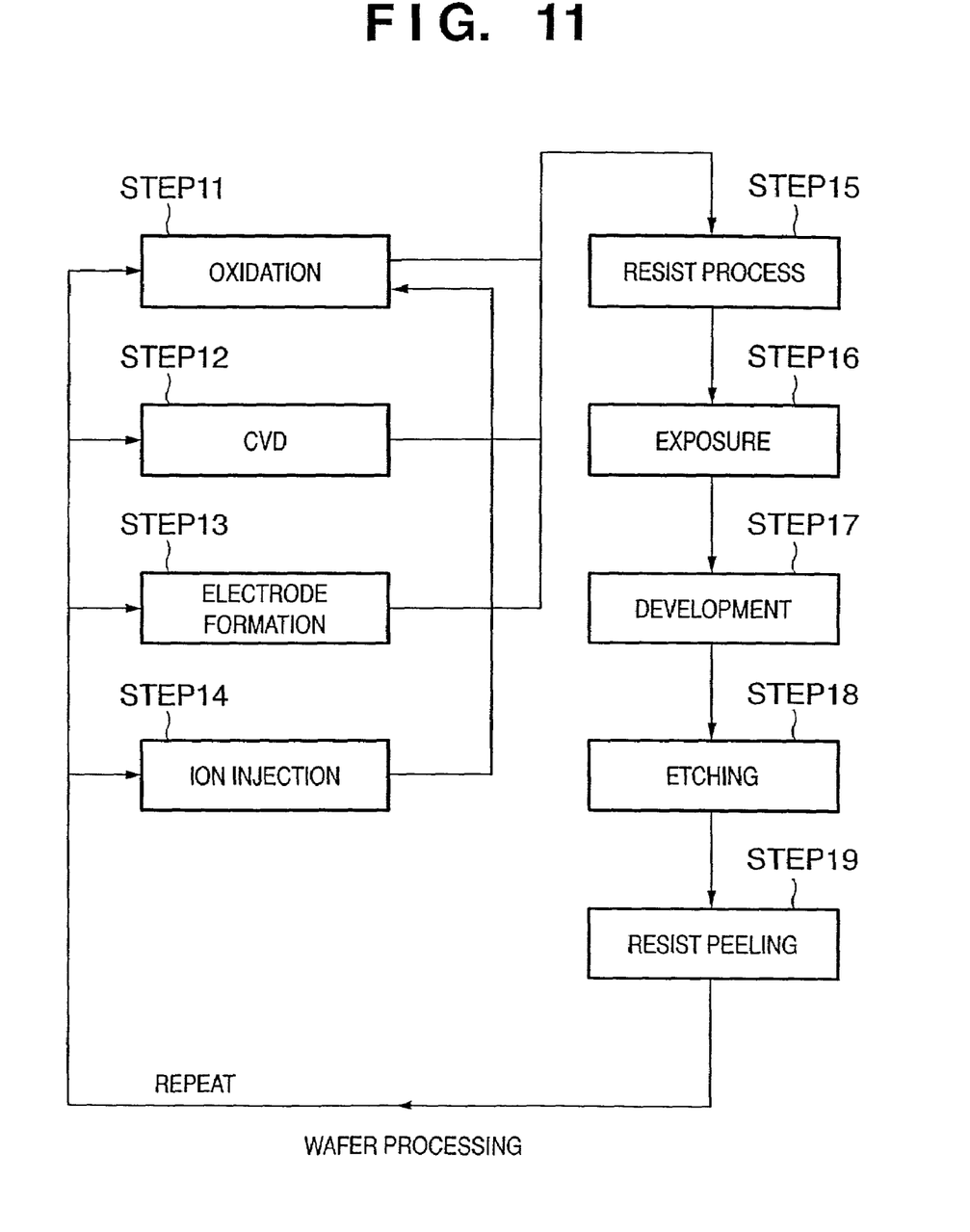
FIG. 11 is a flow chart illustrating a wafer process.

FIG. 11 is a flow chart illustrating a wafer process. In step 11 (oxidation), the surface of the wafer is oxidized. In step 12 (CVD, or chemical vapor deposition), an insulating film is formed on the surface of the wafer. In step 13 (electrode formation), electrodes are vapor-coated onto the wafer. In step 14 (ion injection), ions are injected into the wafer. In step 15 (resist processing), the wafer is coated with a photosensitive agent. In step 16 (exposure), the mask pattern is burnt into the wafer by the exposure apparatus described above. In step 17 (development), the exposed wafer is developed. In step 18 (etching) the parts other than the resist image are removed. In step 19 (resist peeling), the etching process is completed and the no-longer-needed resist is peeled away.

By repeating the above-described steps, circuit patterns in multiple layers are formed on the wafer. The production equipment used in each of the production processes is maintained using the remote maintenance system described above, so in addition to forestalling trouble indefinitely, even that trouble which does occur can be repaired promptly, thus improving semiconductor device production yields over that of the conventional art.

As described above, according to the present embodiment, the exhaust groove and labyrinth seal part can be formed of a minimum single step, thus permitting the hydrostatic bearing apparatus to be made compact and lightweight. Additionally, by reducing the number of vacuum pumps required, the cost of the apparatus can be reduced and a stage capable of movement in two dimensions inside the vacuum chamber can be more easily designed.

As many apparently widely different embodiments of the present invention can be made without departing from the spirit and scope thereof, it is to be understood that the invention is not limited to the specific preferred embodiments described above thereof except as defined in the claims.

What is claimed is:

1. A stage apparatus comprising:
   a stage member being movable along a guide surface;
   a first member mounted to the stage member;
   a hydrostatic bearing pad provided with the first member;
   a second member provided with the stage member so as to surround the hydrostatic bearing pad;
   a gap adjustment mechanism that adjusts a gap between the second member and the guide surface;
   a sensor that senses the gap; and
   a control unit that controls the gap adjustment mechanism based on the sensor output.

2. The stage apparatus according to claim 1, further comprising:
   an exhaust mechanism that exhausts air spurting out from the hydrostatic bearing pad.

3. The stage apparatus according to claim 2, wherein the second member is mounted on the stage member and is movable to the first member.

4. The stage apparatus according to claim 3, further comprising a sealing member that seals a space between the first member and the second member.

5. The stage apparatus according to claim 1, wherein the gap adjustment mechanism has a driving mechanism that moves the second member relative to the stage member.

6. The stage apparatus according to claim 1, further comprising a pre-loading mechanism that generates a force pulling the second member in the stage member.

7. The stage apparatus according to claim 6, wherein the stage member is driven in a vacuum atmosphere.

8. The stage apparatus according to claim 1, wherein the stage member is movable along the guide surface in a two-dimensional direction.

9. A stage apparatus according to claim 1, wherein a plurality of hydrostatic bearing pads are provided; and the second member encircles all of the hydrostatic bearing pads.

* * * * *